United States Patent
Cook

(10) Patent No.: US 8,350,780 B1
(45) Date of Patent: Jan. 8, 2013

(54) SYSTEM, METHOD AND COMPUTER PROGRAM PRODUCT FOR CONTROLLING STEREOSCOPIC GLASSES

(75) Inventor: David Robert Cook, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1184 days.

(21) Appl. No.: 11/532,005

(22) Filed: Sep. 14, 2006

Related U.S. Application Data

(60) Provisional application No. 60/787,730, filed on Mar. 29, 2006.

(51) Int. Cl.
*G09G 5/00* (2006.01)

(52) U.S. Cl. ............. 345/8; 345/7; 345/87; 348/51; 349/15; 359/462; 359/464; 359/466

(58) Field of Classification Search .......... 345/6–9, 345/87, 88, 102, 213; 348/51–60; 359/376, 359/462–464, 466–467; 349/15
See application file for complete search history.

(56) References Cited

U.S. PATENT DOCUMENTS

| | | | |
|---|---|---|---|
| 4,523,226 A | | 6/1985 | Lipton et al. |
| 4,872,750 A | | 10/1989 | Morishita |
| 5,471,237 A | * | 11/1995 | Shipp ............................. 348/46 |
| 5,594,843 A | * | 1/1997 | O'Neill ......................... 345/427 |
| 5,684,529 A | * | 11/1997 | Yoshimi et al. ................ 348/43 |
| 6,057,811 A | * | 5/2000 | Edwards ........................... 345/8 |
| 6,088,052 A | * | 7/2000 | Guralnick ....................... 348/51 |
| 6,108,005 A | * | 8/2000 | Starks et al. .................. 345/419 |
| 6,801,242 B1 | * | 10/2004 | Dwyer ............................. 348/56 |
| 6,996,267 B2 | * | 2/2006 | Tabata ........................... 382/154 |
| 7,046,270 B2 | * | 5/2006 | Murata et al. ................... 348/45 |
| 8,274,448 B1 | | 9/2012 | Cook |
| 2003/0060679 A1 | * | 3/2003 | Murata et al. ................. 600/111 |
| 2004/0057612 A1 | * | 3/2004 | Tabata ........................... 382/154 |
| 2004/0210857 A1 | * | 10/2004 | Srinivasan ........................ 716/2 |
| 2005/0140640 A1 | | 6/2005 | Oh et al. |
| 2006/0170834 A1 | | 8/2006 | Kim et al. ....................... 349/15 |
| 2006/0203085 A1 | | 9/2006 | Tomita ............................ 348/51 |
| 2007/0052640 A1 | | 3/2007 | Feldman |
| 2007/0229395 A1 | | 10/2007 | Slavenburg et al. ............. 345/8 |
| 2007/0229487 A1 | | 10/2007 | Slavenburg et al. ........... 345/213 |

OTHER PUBLICATIONS

Office Action Summary from application No. 11/531,995 mailed on Nov. 24, 2009.
U.S. Appl. No. 11/531,995, filed Sep. 14, 2006.
"i-O Display Systems" http://www.i-glassstore.com/index.html p. 1-2.
Non-Final Office Action from U.S. Appl. No. 11/531,995, dated May 26, 2010.
Final Office Action from U.S. Appl. No. 11/531,995, dated Apr. 12, 2010.
Final Office Action from U.S. Appl. No. 11/531,995, dated Jul. 22, 2011.
Non-Final Office Action from U.S. Appl. No. 11/531,995, dated Feb. 15, 2011.

(Continued)

*Primary Examiner* — Lun-Yi Lao
*Assistant Examiner* — Insa Sadio
(74) *Attorney, Agent, or Firm* — Zilka-Kotab, PC

(57) ABSTRACT

A system, method and computer program product are provided for controlling stereoscopic glasses. In use, at least one aspect of a display is identified. Further, a delay is selected based on the at least one aspect. Thus, the stereoscopic glasses may be controlled as a function of the delay.

20 Claims, 6 Drawing Sheets

OTHER PUBLICATIONS

Final Office Action from U.S. Appl. No. 11/531,995, dated Sep. 28, 2010.

Advisory Action from U.S. Appl. No. 11/531,995, dated Oct. 19, 2011.

* cited by examiner

SYSTEM, METHOD AND COMPUTER PROGRAM PRODUCT FOR CONTROLLING STEREOSCOPIC GLASSES

RELATED APPLICATION(S)

The present application claims priority of a provisional application filed Mar. 29, 2006 under application Ser. No. 60/787,730, which is incorporated herein by reference in its entirety.

FIELD OF THE INVENTION

The present invention relates to viewing stereo display content, and more particularly to stereoscopic glasses adapted for use in viewing stereo display content.

BACKGROUND

Various display devices are equipped for stereo viewing. Unlike mono viewing, stereo viewing involves the display of separate content for the right and left human eye. Specifically, such stereo viewing requires the presentation of a separate image to the left and right human eye. In one particular type of stereo viewing, namely time sequential stereo viewing, such left and right images are presented in an alternating manner. To ensure a proper stereo viewing experience, stereoscopic glasses are also typically used which make the left image only visible to the left eye and the right image only visible to the right eye at the appropriate time [e.g. in response to a vertical synchronization (Vsync) signal, etc.].

In the past, time sequential stereo viewing has worked well on CRTs and related displays [e.g. high frame rate (DLP) projectors, etc.]. However, time sequential stereo viewing has not shown promise with liquid crystal displays (LCDs), whether flat-panel or in the form of a projector, due to several issues. For example, the nature of the LCD update process unfortunately results in only short periods of time when the right image and left image may be present in their entirety, as will now be described in more detail.

FIG. 1 illustrates hypothetical shortcomings that would exist if stereo viewing were attempted utilizing an LCD. As shown in the present hypothetical example, the LCD would receive pixels in raster scan order (i.e. left to right, line by line from top to bottom, etc.) over a cable 10, such as a digital video interface (DVI) or video graphics array (VGA) cable. A first left image. L1 intended for viewing by a left eye is sent over the cable 10 first. Thereafter, there is a pause in transmission called the vertical blanking, interval, after which a first right image R1 intended for the right eye is sent, and so forth.

Unlike CRTs and other related displays, LCD pixels have individual capacitive storage elements that cause each pixel to retain its color and intensity until it is updated by LCD driver-related electronics, which addresses pixels in raster order. Thus, at time T1, when part of the first right image R1 has been sent, the actual image emitted from the LCD screen includes the 'not yet overwritten' (e.g. red) part of first left image L1 at the bottom, and the newly written (e.g. green) part of the first right image R1. Further, at T2, the display includes only the first right image R1. At time 13, the first right image R1 has been partially overwritten by a second left image L2, in the manner shown. To this end, if the display content at time T1 and 13 were shown to the right or left eye, such eye would unfortunately receive content, at least in part, not intended for such eye.

As mentioned earlier, stereoscopic glasses equipped with right and left eye shutters are often employed to ensure that the proper eye views the appropriate image, during stereo viewing. As shown, in the present hypothetical example, after the first right image R1 starts to be displayed, a right eye shutter control 20 switches the right shutter to an open orientation in response to an associated Vsync signal 40A (during which a left shutter is maintained in a closed orientation). Similarly, after a subsequent left image L2 is displayed, a left eye shutter control 30 switches the left shutter to an open orientation again in response to the associated Vsync signal 40B (at which time the right shutter toggles to and is maintained in a closed orientation).

Again, each eye unfortunately, receives content, at least in part, not intended for such eye for a sizeable portion of the duration in which the associated shutter is in the open orientation, resulting in unacceptable stereo viewing. While a post-Vsync, fixed delay has been used in prior art systems for addressing this issue, there is still a continuing need for dealing with this and/or other problems associated with the prior art.

SUMMARY

A system, method and computer program product are provided for controlling stereoscopic glasses. In use, at least one aspect of a display is identified. Further, a delay is selected based on the at least one aspect. Thus, the stereoscopic glasses may be controlled as a function of the delay.

DETAILED DESCRIPTION

Figure 1:
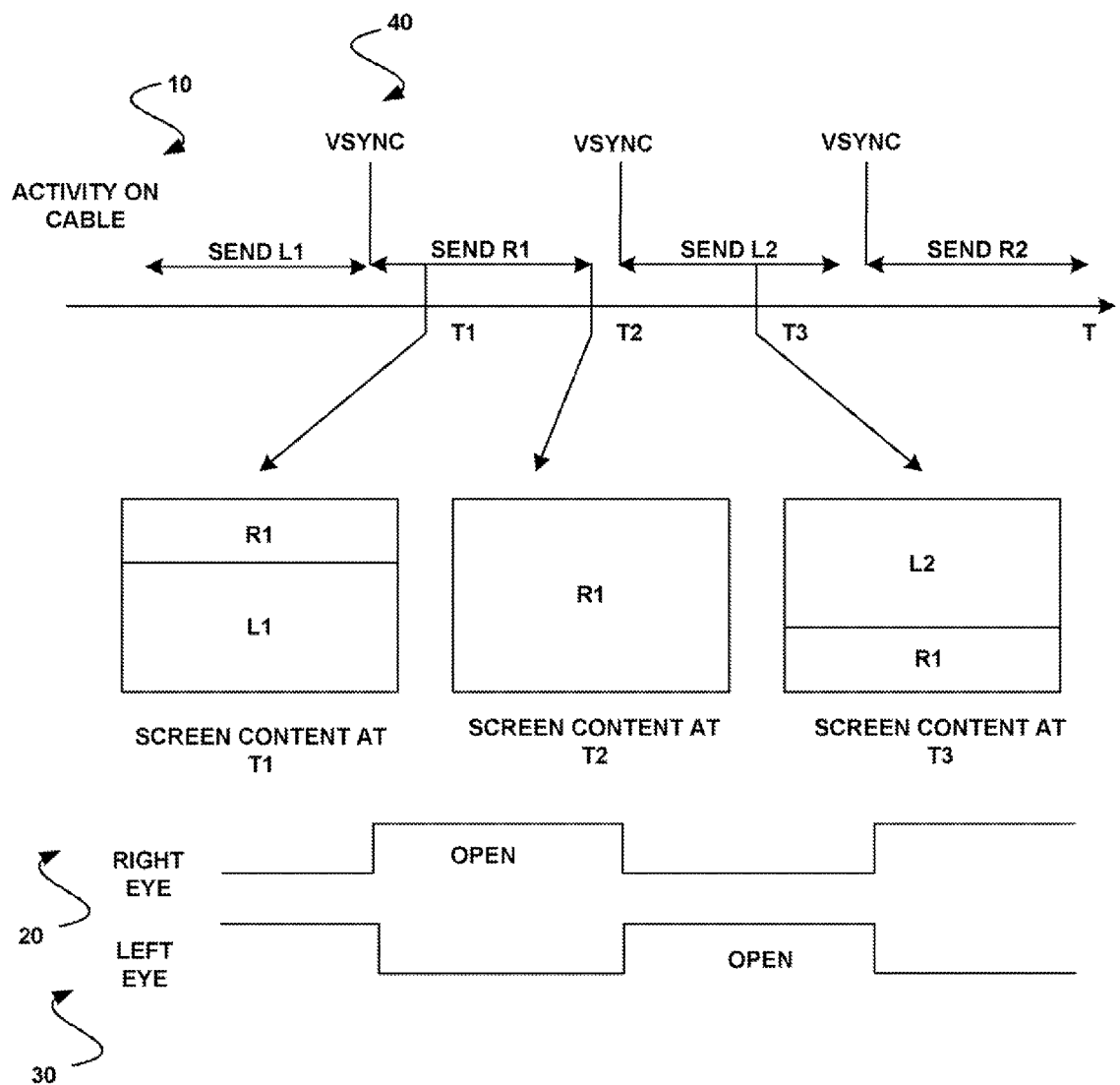
FIG. 1 illustrates hypothetical shortcomings that would exist if stereo viewing were attempted utilizing a liquid crystal display (LCD).
Figure 2:
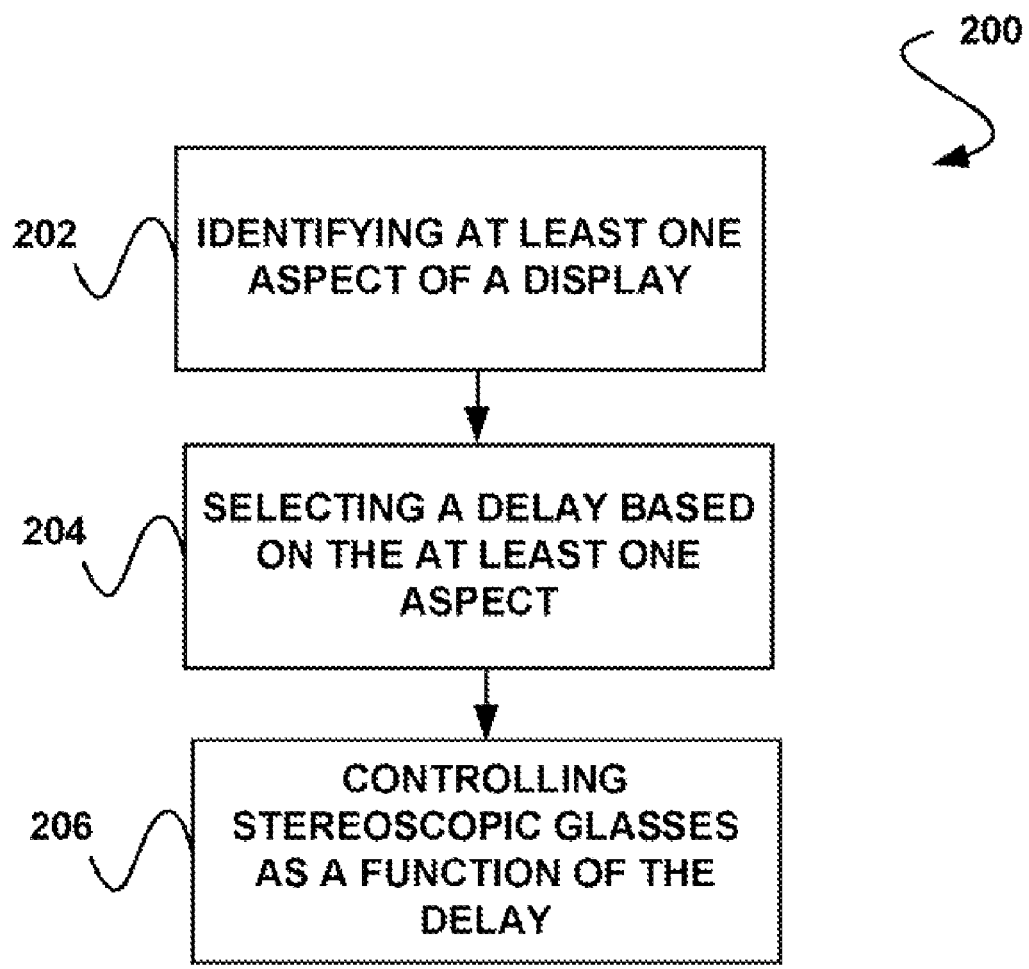
FIG. 2 shows a method for controlling stereoscopic glasses, in accordance with one embodiment.

FIG. 2 shows a method 200 for controlling stereoscopic glasses, in accordance with one embodiment. As shown, at least one aspect of a display is identified. See operation 202. Such display may include a liquid crystal display (LCD), digital light processing (DLP) display, liquid crystal on silicon (LCOS) display, plasma display, or any other display device, for that matter.

Further, in various embodiments, the aforementioned aspect of the display may include a timing associated with the display. For example, the display may be capable of operating in different modes of operation, where each mode has a corresponding timing. Such modes may refer to different resolutions (within the capability of the display), as well as an update rate. One example of a specific mode is shown in Table 1 below:

TABLE 1

(horizontal resolution = 1280) × (vertical
resolution = 1024) × (update rate = 60 Hz)

It should be noted that such exemplary mode is set forth for illustrative purposes only and should not be considered as limiting in any manner. Of course, different values are contemplated.

Still yet, in another embodiment, the aspect may include a physical aspect associated with the display. Thus, in the context of the present description, the aspect may be physical in nature (e.g. mechanical, model/brand, etc.) or operational in nature (e.g. functional, control, etc.), and/or include any other characteristic, feature, etc., for that matter.

In operation 204, a delay is selected based on the at least one aspect. In one embodiment, a plurality of delays may be predetermined and made available, with each delay being associated with different, aspects of different displays. To this end, the delay that corresponds with a particular aspect of a particular display may be selected in operation 204. To accomplish this, a look-up table may be included for providing access to such delays.

In still other embodiments, the look-up table may be accessed utilizing a driver which is used to control the display. In such embodiments, the driver may serve to perform operations 202 and 204. In yet other embodiments, the foregoing functionality of such a driver may be manually or automatically initiated each time a display is selected/detected, in an adaptable/dynamic manner.

Of course, such exemplary selection technique is set forth for illustrative purposes only. For instance, in other embodiments, absolutely any selection technique may be employed which results in the identification eta delay for use in the manner to be set forth below. Just by way of example, the selection may involve the calculation of the delay, and/or any other determination of the delay, for that matter.

Thus, the stereoscopic glasses may be controlled as a function of the delay. See operation 206. In one exemplary embodiment, the stereoscopic glasses may be controlled by incorporating the delay in association with a triggering of the stereoscopic glasses. In the context of the present description, such triggering may refer to any activation/deactivation of the stereoscopic glasses (e.g. switching between an open/closed orientation, etc.).

While the delay may be incorporated and used in any desired manner, it may, in one embodiment, be incorporated by controlling the stereoscopic glasses such that they are triggered after the delay elapses. For example, in one embodiment, the delay may specifically occur after a vertical synchronization (Vsync) signal. Thus, in such embodiment, the Vsync signal, which typically triggers the glasses may, instead, initiate the selected delay, after which the stereoscopic glasses are activated. More information regarding such specific use of the delay will be set forth hereinafter in greater detail during reference to FIG. 3.

In one embodiment, the above delay may be used to reduce a time during which each eye of a user receives content, at least in part, not intended for such eye. Further, such delay may be tuned (e.g. via the aforementioned selection, etc.) to achieve such reduction in an ideal manner. For example, in a situation where a display is updated in an accelerated mode, such delay may be shorter with respect to other modes, etc. While different ways are contemplated of utilizing the aforementioned delay for the foregoing purpose, it should be noted that the delay may be used to control the stereoscopic glasses in any other desired manner for this or any other purpose (to similarly or otherwise improve stereo viewing, etc.).

More illustrative information will now be set forth regarding various optional architectures and features of different embodiments with which the foregoing functionality may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
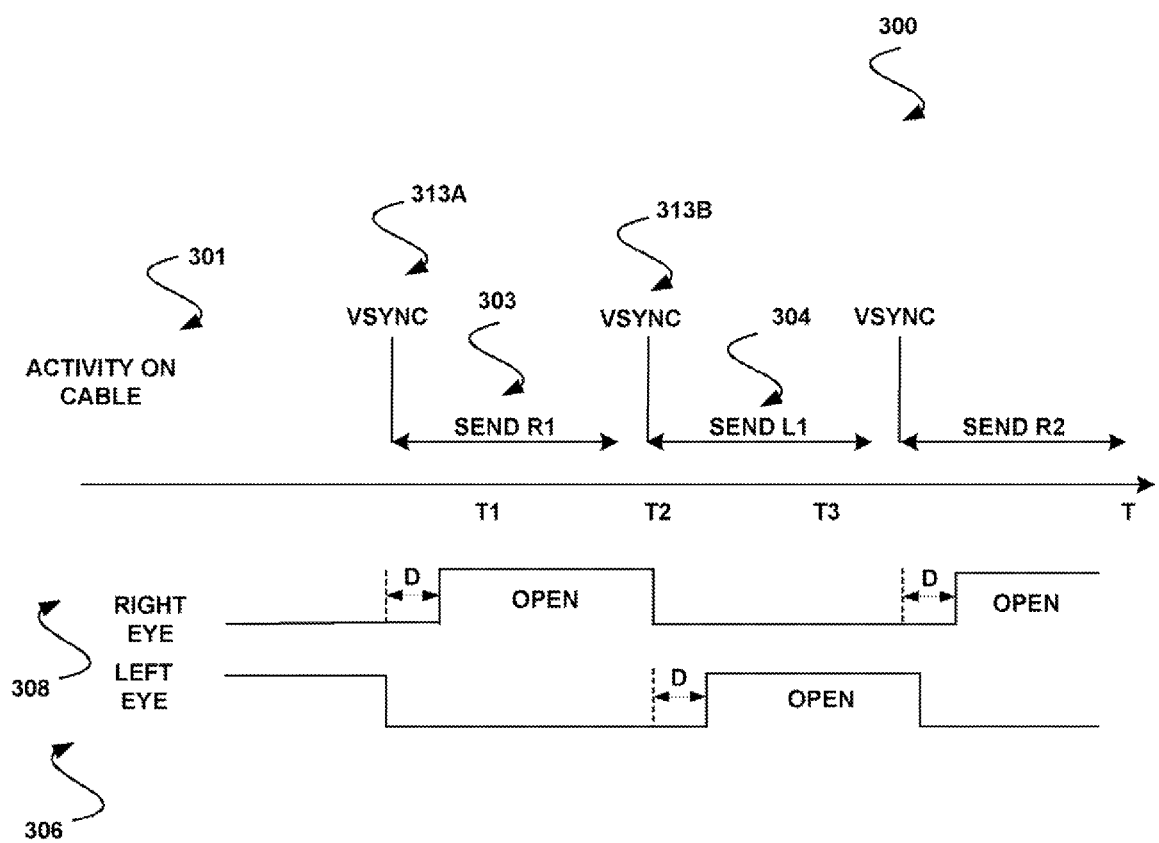
FIG. 3 shows an exemplary timing for controlling stereoscopic glasses, in accordance with one embodiment.

FIG. 3 shows an exemplary timing 300 for controlling stereoscopic glasses, in accordance with one embodiment. As an option, the present timing 300 may be utilized to carry out the method 200 of FIG. 2. Of course, however, the timing 300 may be used in any desired environment. Still yet, the above definitions apply during the following description.

As shown, a display receives display content over a communication medium. 301, such as a digital video interface (DVI) or video graphics array (VGA) cable, or any other medium capable of communicating the display content, for that matter. In the context of the present description, such display content may include pixel-related information, image(s), and/or any other content or component thereof at any stage of processing capable of ultimately being displayed.

In FIG. 3, a first right image R1 intended for viewing only by a right eye is shown to be sent over the communication medium 301 first. Thereafter, there is a pause in transmission, namely the vertical blanking interval. Next, a first left image L1 intended for only the left eye is then sent, and so forth.

As further shown, a right eye shutter and left eye shutter of stereoscopic glasses are controlled independently. In one embodiment, this may be accomplished utilizing a right eye control signal 308 for controlling the right eye shutter and a left control signal 306 for controlling the left eye shutter.

To this end, the right eye shutter of the stereoscopic glasses may be controlled such that right left eye shutter is in an open orientation for a predetermined duration following an associated Vsync signal 313A, which follows the initial receipt of display content intended for the right eye. In a similar manner, the left eye shutter of the stereoscopic glasses may be controlled such that the left eye shutter is in the open orientation for a predetermined duration following an associated Vsync signal 313B, which follows the initial receipt of display content intended for a left eye.

Specifically, after first right display content R1 begins to be received at the display, the right eye shutter of the stereoscopic glasses may be triggered (to take on an open orientation) after a selected delay D following the associated Vsync signal 313A. As mentioned earlier, such delay may be selected as a function of a particular aspect of the display or the particular mode being displayed. By this feature, the system may reduce an amount of previously-depicted left eye display content that the right eye is subjected to, while the right eye shutter is open. This is due to the fact that, as time progresses, more and more of the first right display content R1 overwrites the previously-depicted left eye display content.

Similarly, after the first right display content R1 is completely displayed and first left display content L1 begins to be received at the display (thereby overwriting the right display content R1), the left eye shutter of the stereoscopic glasses may be triggered (to take on an open orientation) after the selected delay D following the associated Vsync signal 313B. Again, the system may reduce an amount of previously-depicted right eye display content R1 that the left eye is subjected to, while the left eye shutter is open to expose the first left display content L1.

By incorporating such delay D in the foregoing manner, the right eye shutter and left eye shutter of the stereoscopic glasses may be controlled such that the right eye shutter and left eye shutter simultaneously remain in the closed orientation for a predetermined amount of time. As mentioned earlier, such technique reduces a duration in which each eye receives content, at least in part, not intended for such eye, resulting in enhanced stereo viewing of content on the display.

Strictly as an option, additional techniques may be employed for further increasing the duration in which the right eye shutter and left eye shutter simultaneously remain in the closed orientation. For example, a falling edge (as opposed to the leading edge) of the respective shutter signals may also be adjusted to accomplish this. More information regarding this and other optional techniques may be found with reference to an application entitled "SYSTEM METHOD, AND COMPUTER PROGRAM PRODUCT FOR CONTROLLING STEREOSCOPIC GLASSES SHUTTERS" filed Aug. 4, 2006 under application Ser. No. 11/462,529, naming, as inventors, Gerrit A. Slavenburg, Thomas F. Fox, and David Robert Cook, and which is incorporated herein by reference in its entirety.

As an additional option, a duration of the aforementioned vertical blanking interval associated with received display content may be increased for enhancing a viewing experience when the display content is viewed utilizing the stereoscopic glasses. More information regarding such optional feature may be found with reference to an application entitled "SYSTEM, METHOD, AND COMPUTER PROGRAM PRODUCT FOR INCREASING AN LCD DISPLAY VERTICAL BLANKING INTERVAL filed Aug. 4, 2006 under application Ser. No. 11/462,535, naming, as inventors, Gerrit A. Slavenburg, Thomas F. Fox, and David Robert Cook, and which is incorporated herein by reference in its entirety.

Figure 4:
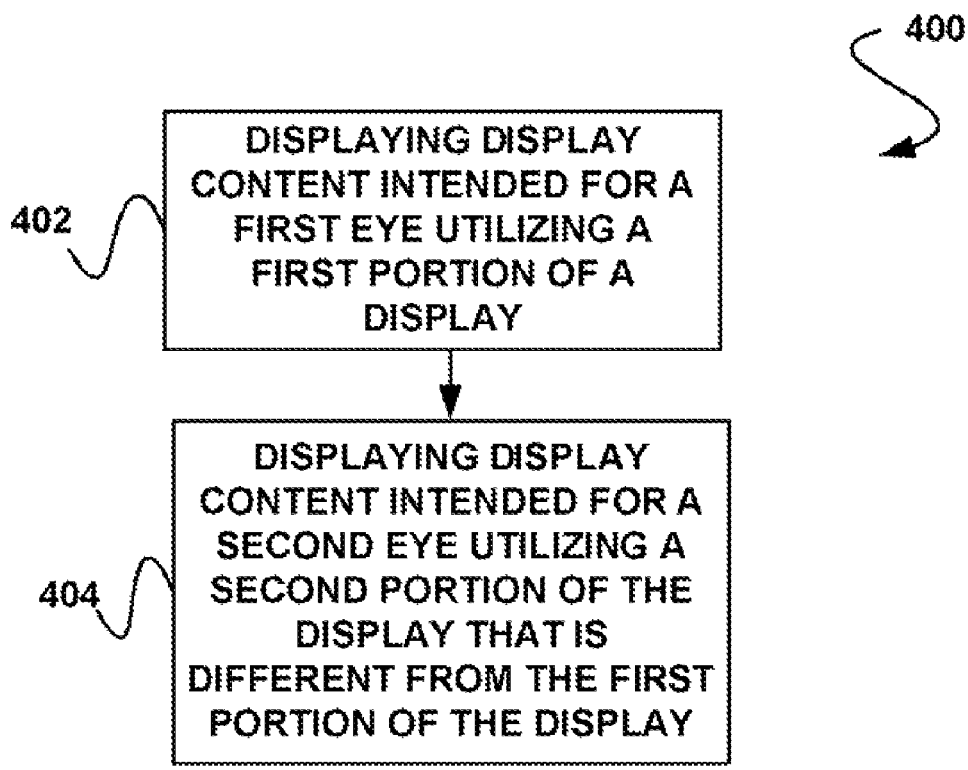
FIG. 4 shows a method for enhancing a stereoscopic display, in accordance with another embodiment.

FIG. 4 shows a method 400 for enhancing a stereoscopic display, in accordance with another embodiment. As an option, the present method 400 may or many not be carried out in the context of the various functionality set forth in FIGS. 2-3. Of course, however, the method 400 may be used in any desired environment. Still yet, the above definitions apply, during the following description.

In operation 402, display content intended for a first eye is displayed utilizing a first portion of a display. Further, display content intended for a second eye is displayed utilizing a second portion of the display that is different from the first portion of the display. See operation 404.

It should be noted that, in one embodiment, the aforementioned portions of the display may include pixels (or groups of pixels, etc.) of the display. Still yet, in other embodiments, the first portion of the display and the second portion of the display may include lines (or groups of lines, etc) of the display. Of course, such exemplary portions are set forth for illustrative purposes only and should not be construed as limiting in any manner whatsoever, since such portions may refer to any part(s) of the display.

Still yet, the first and second portions may be different in any desired manner. For example, in one embodiment, the second portion of the display may be at least partially non-inclusive of the first portion of the display. In other embodiments, the second portion of the display may be fully non-inclusive of the first portion of the display. Of course, embodiments are contemplated where the portions may or may not be mutually exclusive.

Thus, in one example of operation, null content may be displayed in conjunction with the display content. In the context of the present description, such use of null content may refer to any content that is at least partially non-inclusive of the display content. For example, the null content may include substantially black content, or even completely black content.

Specifically, such null content may be displayed utilizing the second portion of the display when the first portion of the display is utilized to display the display content intended for the first eye. Similarly, null content may be displayed utilizing the first portion of the display when the second portion of the display is utilized to display the display content intended for the second eye. Thus, in use, as the display of display content and null content alternates between the two portions of the display, each display content is displayed immediately following the display of null content.

To this end, such use of the null content may, in one embodiment, serve to accelerate a transition to the display of the display content intended for the first and second eye. Specifically, in the case of LCDs or similar displays, a transition from black content to display content with associated color, etc.) occurs faster than a transition between two sets of display content (again, each with associated color, etc.). Thus, by alternating between the null and display content in the foregoing manner, a response time associated with the display of display content may be improved, thus preventing a value of a previous frame from "bleeding" into in a value of a subsequent frame.

This may, in turn, be used to reduce a degree to which display content, at least in part, not intended for a particular eye affects stereo viewing. While different ways are contemplated for utilizing operations 402 and 404 for accomplishing the foregoing optional purpose, it should be noted that such operations may be used in any other desired manner for this or any other purpose (to otherwise improve stereo viewing, etc.).

More illustrative information will now be set forth regarding various optional architectures and features of different embodiments with which the foregoing functionality may or may not be implemented, per the desires of the user. It should be strongly noted that the following information is set forth for illustrative purposes and should not be construed as limiting in any manner. Any of the following features may be optionally incorporated with or without the exclusion of other features described.

Figure 5:
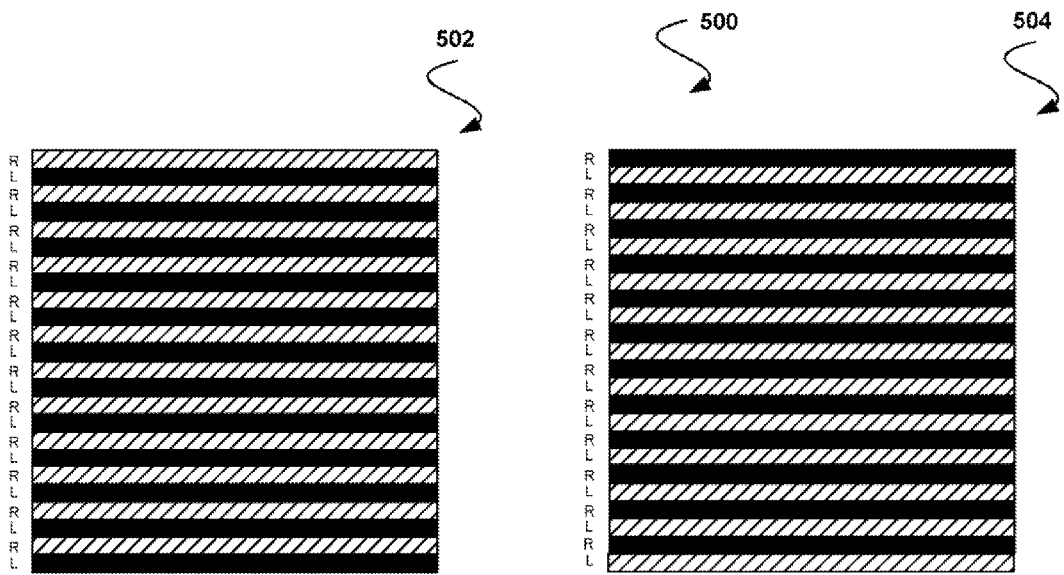
FIG. 5 illustrates a first example for enhancing a stereoscopic display, in accordance with yet another embodiment.
Figure 6:
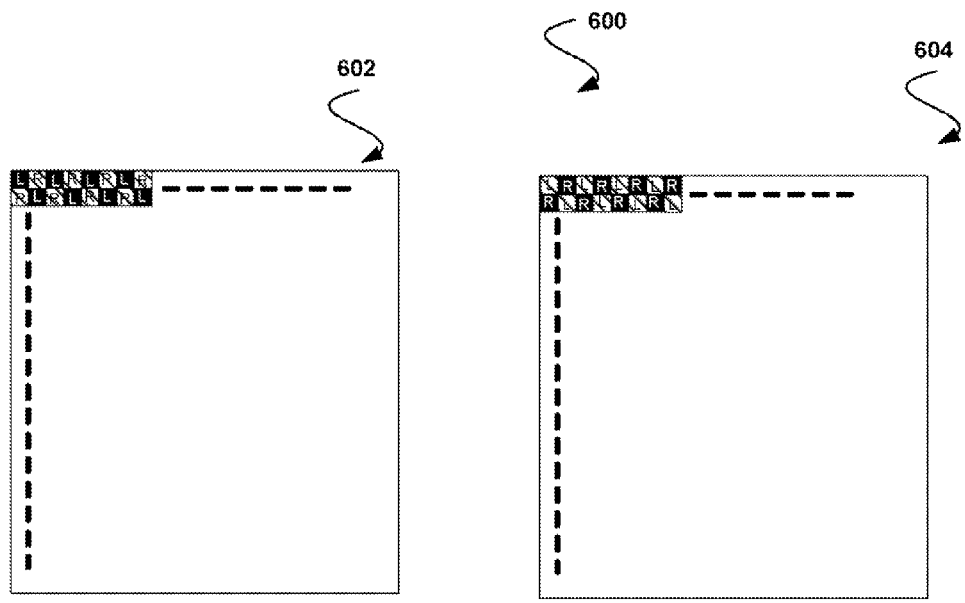
FIG. 6 illustrates a second example for enhancing a stereoscopic display, in accordance with still yet another embodiment.

FIGS. 5 and 6 illustrate examples 500 and 600 for enhancing a stereoscopic display, in accordance with different embodiments. As an option, the present examples 500 and 600 may be implemented in the context of the various functionality set forth in FIG. 4. Of course, however, the examples 500 and 600 may be used in any desired environment. Again, the above definitions during the following description.

As shown in FIG. 5, display content intended for a right and left eye are separated spatially by using odd scan lines for display content intended for viewing by the right eye and even scan lines for display content intended for viewing by the left eye. Of course, other embodiments are contemplated where even scan lines are used for display content intended for viewing by the right eye and odd scan lines are used for display content intended for viewing by the left eye. Still yet, multiple adjacent lines may be combined and considered as the first and second portions of the display, respectively.

With continuing reference to FIG. 5, first content 502 is displayed which is intended for a right eye. As shown, the odd scan lines are used to display content intended for viewing by the right eye, while the even scan lines are used to display null content. Similarly, thereafter, second content 504 is displayed which is intended for a left eye. As shown, the even scan lines are used to display content intended for viewing by the left eye, while the odd scan lines are used to display null content. By alternating between the first content 502 and the second content 504, the display content is displayed following the display of null content, thus reducing response time, etc.

As shown in FIG. 6, an alternate approach is illustrated where the portions of the display take a different form, namely pixels, in such embodiment, display content intended for a right and left eye are separated spatially by using alternating pixels for display content intended for viewing by the appropriate eye. Of course, other embodiments are contemplated where even different patterns of pixels are employed.

As further shown in FIG. 6, first content 602 is displayed which is intended for a right eye. As illustrated, a first set of pixels is used to display content intended for viewing by the right eye, while a second set of pixels is used to display null content. Similarly, second content 604 is subsequently displayed which is intended for a left eye. As shown, the second set of pixels is used to display content intended for viewing by the left eye, while the first set of pixels is used to display null content. Again, by alternating between the first content 602 and the second content 604 the display content is displayed following the display of null content, thus reducing response time, etc.

While the foregoing technique may potentially reduce a resolution (e.g. by one half, etc.), it has the potential of reducing, if not eliminating, the aforementioned ghosting, etc. While complete separation of the right and left eye display content is set forth in the embodiments discussed hereinabove, it should be noted that other embodiments are contemplated where varying compromises are struck between a reduction in resolution and ghosting elimination.

Figure 7:
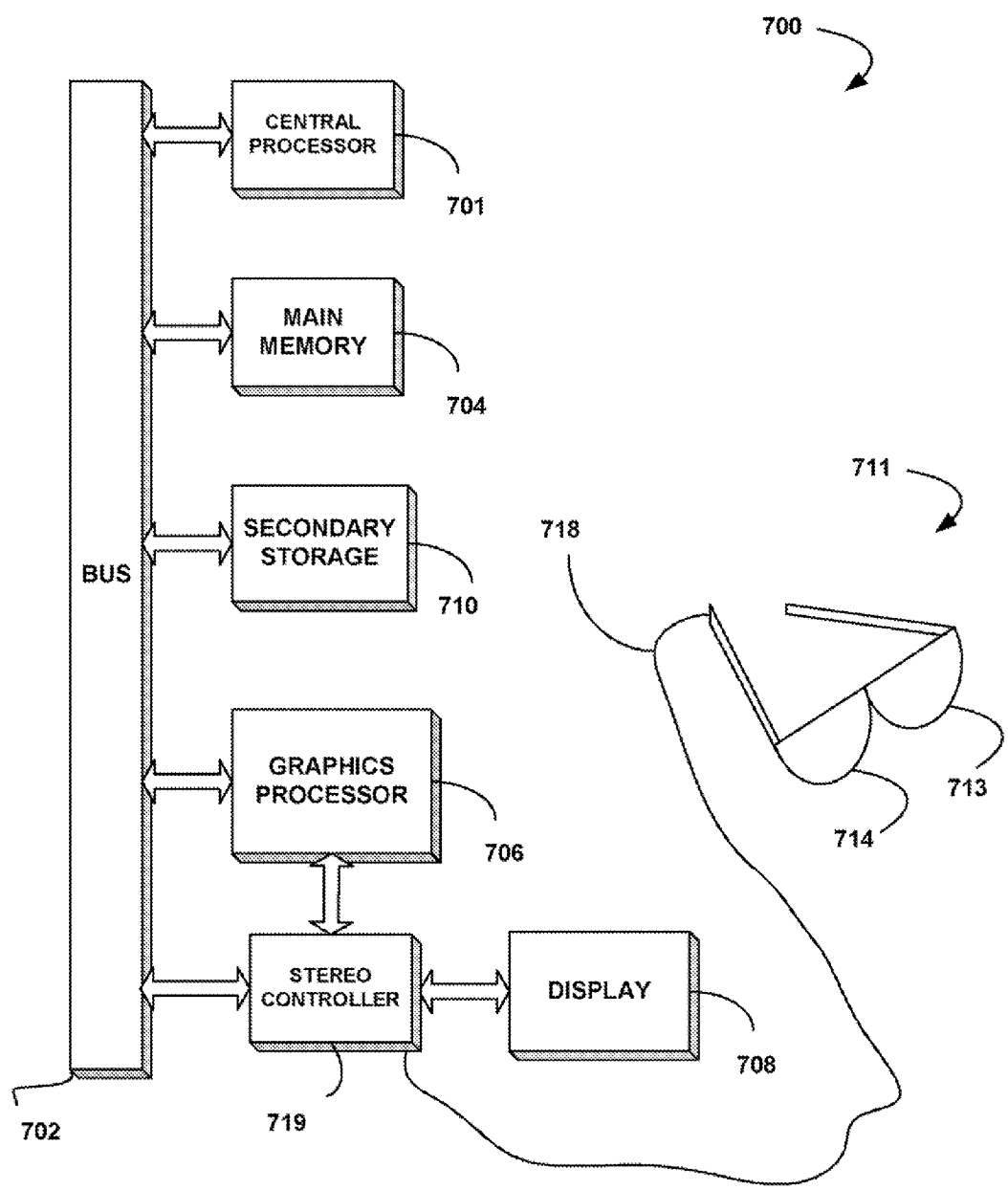
FIG. 7 illustrates an exemplary computer system in which the various architecture and/or functionality of different embodiments may be implemented.

FIG. 7 illustrates an exemplary computer system 700 in which the various architecture and/or functionality of different embodiments may be implemented. As an option, the computer system 700 may be implemented in the context of the functionality and/or environment of the previous figures. Of course, however, the system computer system 700 may be implemented in any desired environment. Again, the definitions introduced hereinabove apply during the following description.

As shown, a computer system 700 is provided including at least one host processor 701 which is connected to a communication bus 702. The computer system 700 also includes a main memory 704. Control logic (software) and data are stored in the main memory 704 which may take the form of random access memory (RAM).

The computer system 700 also includes a graphics processor 706 and a display 708 in the form of an LCD, DLP display, LCOS display, plasma display, or other similar display. In one embodiment, the graphics processor 704 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the computer system 700 to perform various functions. Memory 704, storage 710 and/or any other storage are possible examples of computer-readable media.

Further included is a pair of stereoscopic glasses 711 capable of being worn on a face of a user. The stereoscopic glasses 711 include a right eye shutter 714 and a left eye shutter 713 that are capable of both an open orientation and a closed orientation. In use, the open orientation allows more light therethrough with respect to the closed orientation. Of course, such orientations may be achieved by any desired mechanical, electrical, optical (e.g. by way of various polarizations, etc.), and/or any other mechanism capable of carrying out the above functionality.

For control purposes, the stereoscopic glasses 711 may be coupled to a stereo controller 719 via a cable 718 (or without the cable 718 in a wireless environment). The stereo controller 719 is, in turn, coupled between the graphics processor 706 and the display 708 for carrying out the functionality to be set forth hereinabove. In some embodiments (e.g. particularly in the case of wireless stereoscopic glasses, etc.), the right eye shutter 714 and the left eye shutter 713 of the stereoscopic glasses 711 may be controlled utilizing a plurality of signals (e.g. codes, etc.). Of course, separate signals may be used to close only the right eye shutter 714, the left eye shutter 713, etc.

While the stereo controller 719 is shown to reside between the graphics processor 706 and the display 708, it should be noted that the stereo controller 719 may reside in any location associated with the computer system 700, the stereoscopic glasses 711, and/or even in a separate module, particularly (but not necessarily) in an embodiment where the graphics processor 706 is attached to a separate interface (e.g. USB, etc.) on the computer system 700. Still yet, the stereo controller 719 may comprise any hardware and/or software capable of the providing the desired functionality.

In various embodiments, the architecture and/or functionality of the various following figures may be implemented in the context of the host processor 701, graphics processor 706, stereo controller 719, a chipset (i.e. a group of integrated circuits designed to work and sold as a unit for performing related functions, etc.), and/or any other integrated circuit for that matter. Still yet, the architecture and/or functionality of the various following figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
identifying at least one aspect of a display device, the at least one aspect including at least one of a physical aspect of the display device and an operational aspect of the display device;
upon detection of the display device, automatically selecting a delay based on the at least one aspect of the display device; and
controlling stereoscopic glasses, including activating and deactivating the stereoscopic glasses, as a function of the delay by triggering both a left eye shutter and a right eye shutter of the stereoscopic glasses as a function of the selected delay.

2. The method as recited in claim 1, wherein the display device includes a liquid crystal display device.

3. The method as recited in claim 1, wherein the at least one aspect includes a timing associated with the display device.

4. The method as recited in claim 3, wherein the at least one aspect includes the timing of a mode of operation associated with the display device.

5. The method as recited in claim 1, wherein the at least one aspect includes the physical aspect associated with the display device.

6. The method as recited in claim 5, wherein the physical aspect of the display device includes a model or a brand associated with the display device.

7. The method as recited in claim 1, wherein the delay is selected utilizing a look-up table.

8. The method as recited in claim 7, wherein the look-up table is accessed utilizing a driver.

9. The method as recited in claim 1, wherein the delay is selected from a plurality of delays associated with different aspects of different display devices.

10. The method as recited in claim 1, wherein the stereoscopic glasses are triggered after the delay elapses.

11. The method as recited in claim 10, wherein the delay occurs after a vertical synchronization signal.

12. The computer program as recited in claim 1, wherein the stereoscopic glasses are triggered after the delay elapses.

13. The computer program as recited in claim 12, wherein the delay occurs after a vertical synchronization signal.

14. The method of claim 1, wherein the delay that is selected based on the at least one aspect of the display device is predetermined and corresponds with a timing associated with a mode of operation of the display device.

15. The method of claim 14, wherein the mode of operation of the display device includes a horizontal resolution, vertical resolution, and an update rate of the display device.

16. A computer program embodied on a non-transitory computer readable medium, comprising:
computer code for, upon detection of a display device, automatically identifying a delay based on at least one aspect of the display device, the at least one aspect including at least one of a physical aspect of the display device and an operational aspect of the display device; and
computer code for controlling stereoscopic glasses, including activating and deactivating the stereoscopic glasses, as a function of the delay by triggering both a left eye shutter and a right eye shutter of the stereoscopic glasses as a function of the selected delay.

17. The computer program as recited in claim 16, wherein the delay is selected utilizing a look-up table.

18. The computer program as recited in claim 16, wherein the display device includes a liquid crystal display device.

19. A system, comprising:
a driver for identifying at least one aspect of a display device, the at least one aspect including at least one of a physical aspect of the display device and an operational aspect of the display device, and upon detection of the display device, automatically selecting a delay based on the at least one aspect of the display device;
wherein the driver is capable of being utilized to control stereoscopic glasses, including activating and deactivating the stereoscopic glasses, as a function of the delay by triggering both a left eye shutter and a right eye shutter of the stereoscopic glasses as a function of the selected delay.

20. The system as recited in claim 19, wherein further included is a computer in communication with the stereoscopic glasses for displaying stereo display content via the display device.

* * * * *